July 3, 1956
S. GARDNER
2,752,722
RAT TRAP
Filed Sept. 22, 1953
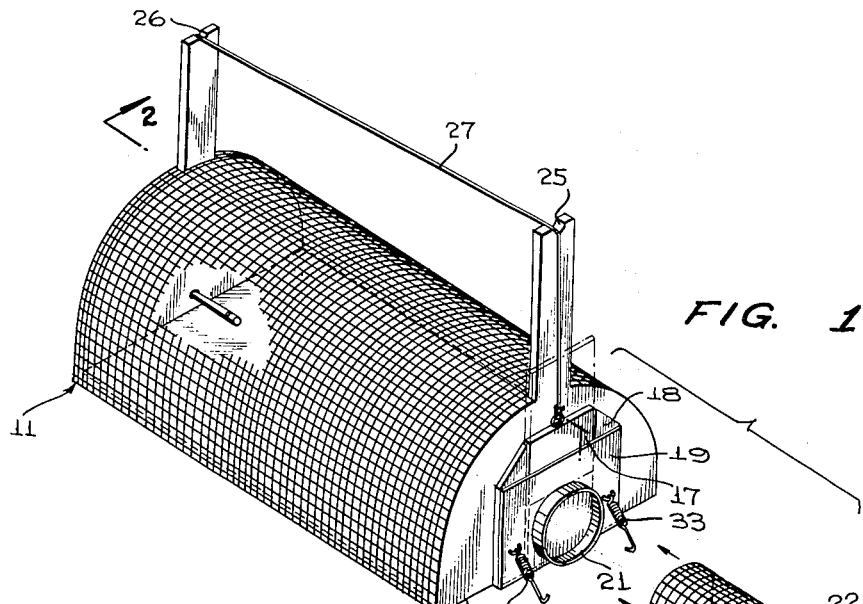
FIG. 1
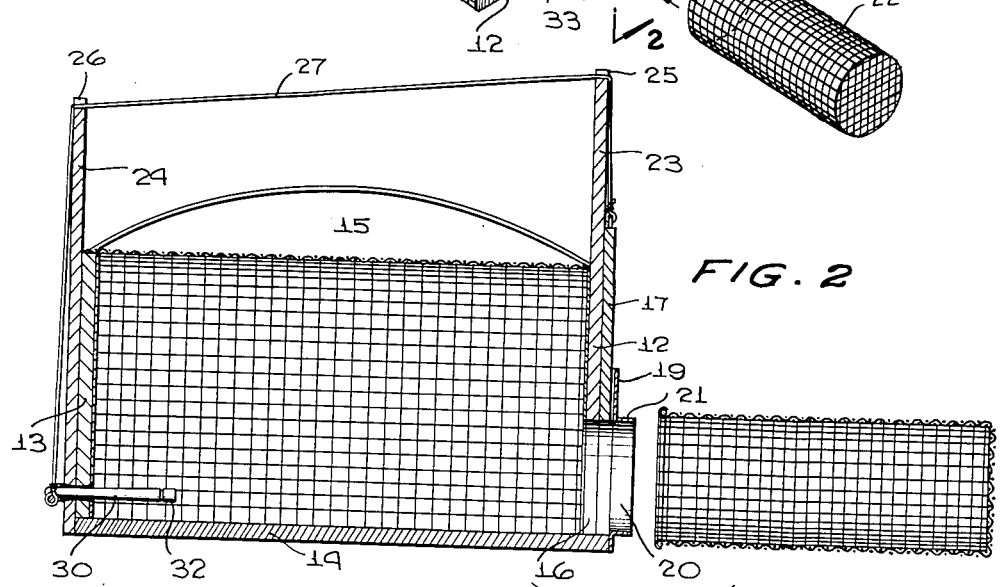
FIG. 2
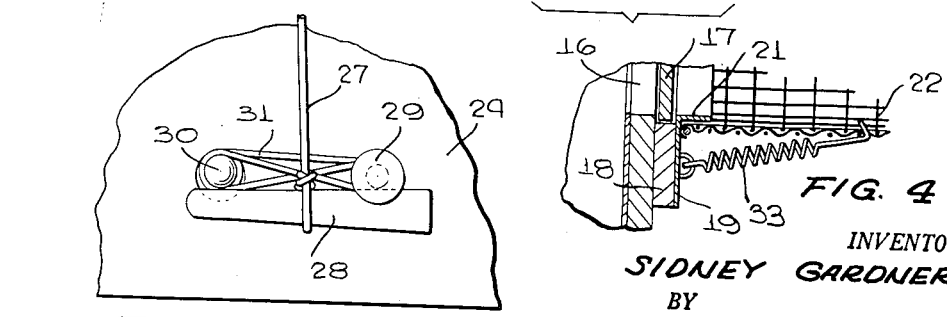
FIG. 3
FIG. 4
INVENTOR.
SIDNEY GARDNER,
BY
McMorrow, Berman & Davidson
ATTORNEYS

United States Patent Office 2,752,722
Patented July 3, 1956

2,752,722
RAT TRAP
Sidney Gardner, Washington, D. C.
Application September 22, 1953, Serial No. 381,537
1 Claim. (Cl. 43—61)

This invention relates to animal traps, and more particularly to an improvement in rat traps.

The main object of the invention is to provide an improved rat trap which is simple in construction, which is reliable in operation, and which is provided with means for easily removing a rodent entrapped therein.

A further object of the invention is to provide an improved rodent trap which is inexpensive to manufacture, which is sturdy in construction, which is relatively compact in size, and which is easy to set.

Further objects and advantages of the invention will become apparent from the following description and claim, and from the accompanying drawings, wherein:

Figure 1 is a perspective view of an improved rat trap constructed in accordance with the present invention.

Figure 2 is a vertical cross sectional view taken longitudinally through the trap on the line 2—2 of Figure 1.

Figure 3 is an enlarged elevational detail view of the portion of the rear wall of the trap of Figures 1 and 2 including the trigger pin, trigger bar and abutment pin for the trigger bar, employed in the trap of Figures 1 and 2.

Figure 4 is an enlarged horizontal cross sectional detail view taken through a portion of the detachable receptacle member and the securing means therefor, employed in the trap of Figures 1 and 2.

Referring to the drawings, the rodent trap is designated generally at 11 and comprises a cage having the front wall 12, the rear wall 13, the bottom wall 14, and the foraminous sheet 15 secured to the side edges of the bottom wall and the top and side edges of the front and rear walls, defining a trap enclosure, as is clearly shown in Figures 1 and 2. The front and rear walls 12 and 13 may be of any suitable shape, for example, semicircular in shape, as illustrated.

The front wall 12 is formed with a trap opening 16 and is provided with the vertically slidable trap closure member 17 which is slidable over the opening 16. The trap door 17 is slidable between respective guide blocks 18, 18 secured to the wall 12 at opposite sides of the opening 16, the blocks 18, 18 extending vertically and defining a guideway between which the trap door 17 is slidable. Secured to the faces of the blocks 18, 18 is the vertical plate member 19, the trap door 17 being slidable between the plate member 19 and the front wall 12 of the cage. The plate member 19 is formed with the flanged circular opening 20 which is in registry with the trap opening 16 of the wall 12, the flange 21 of the opening 20 projecting forwardly from the main body portion of the plate 19. Designated at 22 is a foraminous cylindrical receptacle which is engageable at times on the flange 21 for a purpose presently to be described.

Front wall 12 is formed with the vertically extending upstanding arm 23 projecting from its top edge, and secured to the rear wall 13 is the vertically extending, upwardly projecting bar member 24. The arm 23 and bar member 24 are formed with respective guide notches 25 and 26, and slidably engaged in said notches is the flexible cable member 27, one end of said cable member being secured to the top edge of the trap door 17. The other end of the cable member 27 is fastened to the intermediate portion of a trigger bar 28 which is normally engaged beneath an abutment pin 29 secured to the rear member 24 and the end of a tapered trigger pin 30 projecting through rear wall 13 and member 24, thus normally supporting the trap door 17 in an elevated position, as shown in Figure 2, allowing access to the interior of the cage by a rodent.

As shown in Figure 3, the end of the trigger pin 30 is fastened to the abutment pin 29 by flexible fastening means, such as a rubber band 31, allowing the pin 30 to be at times retracted inwardly into the cage but preventing the pin from becoming completely detached from the abutment member 29.

The inner end of the trigger pin 30 is provided with the head portion 32 on which may be placed suitable bait, the bait preferably being in the form of a paste or coating which may be spread on the head 32, whereby a rodent in the cage will be attracted to the head 32 and will exert an inward pull on the trigger pin 30. Thus, with the trap set in the position shown in Figure 2, a rodent will enter the cage and will attempt to bite the head 32 of the trigger pin 30, the trigger pin being pulled inwardly by the rodent during this process, causing the trigger bar 28 to be released, and allowing the trap door 17 to descend, thus trapping the rodent in the cage.

After the rodent has been thus trapped, it may be killed by any suitable means, and may be removed by engaging the receptacle 22 on the flange 21, the receptacle 22 being detachably secured on said flange by respective diametrically opposed spring hooks 33, 33 connected to the plate 19 on opposite sides of the flange opening 20, the hooks being engaged with the foraminous receptacle 22 to secure the receptacle on the flange 21, allowing the rodent to be shaken into the receptacle for subsequent removal.

It will be readily understood that after the rodent has been removed from the trap, the trigger pin 32 may be rebaited and may be reset to the position thereof shown in Figure 2, the trigger bar 28 being then engaged beneath the outer end of the trigger pin 30 and the abutment element 29, to support the trap door 17 in an elevated position, in preparation for the entrapment of another rodent.

While a specific embodiment of an improved animal trap has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In an animal trap comprising a cage having a bottom wall, front and rear walls rising from said bottom wall, and a foraminous sheet closing the space between said bottom wall and said front and rear walls and secured to the side edges of the bottom wall and the top and side edges of said front and rear walls, an upstanding arm projecting from the upper end of each of said front and rear walls, there being a trap opening in said front wall, and a trap door movable over said trap opening, the improvement consisting in an abutment pin secured to the said rear wall, a trigger bar normally engaged beneath said abutment pin, a horizontally disposed trigger pin slidably supported in an aperture in said rear wall, the said trigger pin having one end extending exteriorly of said rear wall and having the other end positioned above and spaced from said bottom wall, a bait holder on the other end of said trigger pin, a flexible cable extending slidably over said arms and having one end operatively connected to said one end of said trigger bar and having the other end secured to said trap door, said trigger bar releasably abutting the trigger pin and the abutment pin in set position, and an elastic band connecting the abutment pin to the trigger pin, whereby when the trigger pin is released, the cable member will withdraw the trigger bar from engagement with the abutment pin, the elastic band retaining the trigger pin in connecting relation to the abutment pin to facilitate re-setting.

References Cited in the file of this patent

UNITED STATES PATENTS

| | | |
|---|---|---|
| 812,472 | Alsobrook | Feb. 13, 1906 |
| 986,010 | Kennedy | Mar. 7, 1911 |
| 1,222,406 | Jakob | Apr. 10, 1917 |
| 1,297,893 | Nash | Mar. 8, 1919 |
| 2,059,954 | McDonald | Nov. 3, 1936 |
| 2,193,937 | Pirani et al. | Mar. 19, 1940 |
| 2,374,522 | Andrews | Apr. 24, 1945 |